Sept. 6, 1966    F. L. FLODIN    3,271,042
TRAILER WITH LIFT-TYPE LOAD BED
Filed Jan. 9, 1964    2 Sheets-Sheet 1

Frank L. Flodin
INVENTOR.

Sept. 6, 1966  F. L. FLODIN  3,271,042
TRAILER WITH LIFT-TYPE LOAD BED
Filed Jan. 9, 1964  2 Sheets-Sheet 2

Frank L. Flodin
INVENTOR.

BY
Attorneys

United States Patent Office 3,271,042
Patented Sept. 6, 1966

3,271,042
TRAILER WITH LIFT-TYPE LOAD BED
Frank L. Flodin, Sunnyside, Wash., assignor to Flodin Inc., Sunnyside, Wash., a corporation of Washington
Filed Jan. 9, 1964, Ser. No. 336,748
4 Claims. (Cl. 280—43.23)

This invention relates to a novel and useful trailer having a lift-type load bed and more specifically to a trailer designed primarily as a small pickup trailer for use in vineyards, orchards and the like.

The trailer of the instant invention includes a main frame to which the forward ends of a pair of trailing arm assemblies are pivotally secured for rotation about an axis extending transversely of the frame of the trailer and ground-engaging support wheels are journaled from the rear ends of the arm assemblies. Fluid motor means is operatively connected between the free ends of the trailing arm assemblies and the frame whereby the frame may be raised and lowered relative to the ground-engaging wheels. In addition, the main frame of the trailer is provided with an elongated tongue assembly whose rear end is pivotally secured to the forward end of the frame of the trailer for rotation about an axis extending transversely of the frame. The forward end of the tongue is adapted for swivelled coupling engagement with a towing vehicle.

Inasmuch as it is desirable to keep the main load-supporting frame of the trailer horizontally disposed when it is in the lowered position, elongated and extendable fluid motor means is operatively connected between the free swinging end of the tongue and the main frame whereby the tongue may be pivoted relative to the frame as the trailing arms are pivoted relative to the frame in order that the forward end of the frame may be raised or lowered at the same time that the rear portion of the frame is raised or lowered.

The main object of this invention is to provide a small pickup trailer for use in vineyards and the like which is specifically adapted to carry pallets upon which boxes of produce can be loaded and then transported to a central location where the pallets may be unloaded.

Another object of this invention is to provide a small pickup trailer including means defining a main frame which may be raised and lowered relative to the ground-engaging support wheels of the trailer and maintained in a substantially horizontally disposed position when lowered.

Yet another object of this invention, in accordance with the immediately preceding object, is to provide a trailer including a main frame defined by a pair of longitudinally extending opposite side frame members which are interconnected at their forward ends only thereby enabling loaded pallets or the like to be supported between the frame members and to be lowered below the upper surface of an elongated support straddled by said frame members thereby transferring the load of the pallets from the longitudinal frame members to the elongated support member even while the trailer is in forward motion.

Still another object of this invention, in accordance with the immediately preceding object, is to provide a main support frame including a pair of longitudinally extending opposite frame members which are interconnected at their forward ends by means of an extremely rigid and inverted generally U-shaped member whereby the longitudinal opposite side frame members of the trailer may be disposed lowermost with the exception of the ground-engaging support wheels of the trailer, the latter being disposed outwardly of the remote sides of the longitudinal frame members.

Still another object of this invention is to provide a trailer in accordance with the preceding objects including means for raising and lowering the lift-type load bed thereof adapted to be actuated from a remote location such as from the vehicle by which the trailer is towed.

A final object of this invention to be specifically enumerated herein is to provide a lift-type load bed trailer which will conform to conventional forms of manufacture, be of simple construction and easy to use so as to provide a device that will be economically feasible, long-lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a fragmentary enlarged horizontal sectional view illustrating the manner in which the trailing arm assemblies are pivotally supported from the frame of the trailer.

Figure 1:
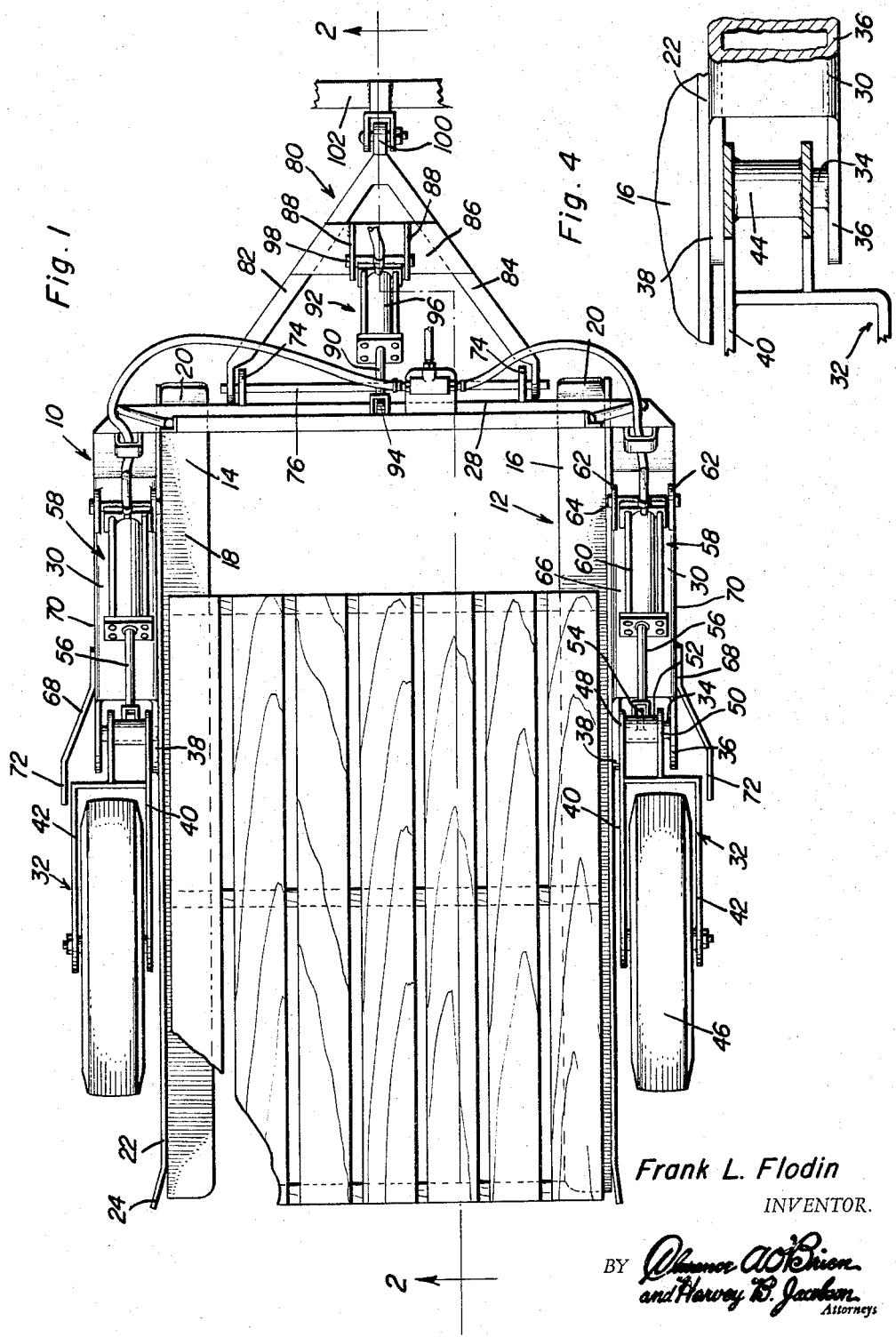
FIGURE 1 is a top plan view of the lift-type load bed trailer of the instant invention shown with a pallet supported from the longitudinal frame members of the trailer and portions of the pallet being broken away.

Referring now more specifically to the drawings the numeral 10 generally designates the lift-type load bed trailer of the instant invention. The trailer 10 includes a main frame generally referred to by the reference numeral 12 and including a pair of longitudinally extending elongated opposite side frame members 14 and 16 which are generally L-shaped in cross-section. The frame members 14 and 16 each include a horizontal flange 18 which is turned upwardly at its forward end as at 20 and an upstanding flange 22 which is turned outwardly at its rear end as at 24.

The trailer main frame longitudinal members 14 and 16 are interconnected at their forward ends only by means of a transverse brace assembly generally referred to by the reference numeral 26 including a tubular crossbeam 28 and a pair of longitudinal reinforcing members 30. The crossbeam 28 is secured to the upper surface of the forward ends of the reinforcing members 30 and the inner faces of the reinforcing members are secured to the outer faces of the upstanding flanges 22. The reinforcing members are tubular in configuration and are generally rectangular in cross-section.

A pair of trailing arm assemblies generally referred to by the reference numerals 32 are pivotally secured at their forward ends to the rear ends of the reinforcing members 30 by means of pivot pins 34 extending between the rear ends of the opposite side walls 36 and 38 of the corresponding reinforcing members 30. Each of the trailing arm assemblies includes a pair of generally parallel inner and outer arm members 40 and 42 which are interconnected at their forward ends by means of a sleeve 44 that rotatably receives the corresponding pivot pin 34.

A ground-engaging wheel 46 is journaled between the free ends of each pair of arm members 40 and 42 and the arm members 40 and 42 include upwardly projecting lever arms 48 and 50, respectively, which are secured at their lower ends to the forward ends of the arm members 40 and 42 and are interconnected at their upper ends by means of a rigid sleeve 52. Each rigid sleeve 52 has an apertured mounting lug 54 projecting generally radially outwardly thereof to which the free end of the piston rod 56 of an extensible fluid motor generally referred to by the reference numeral 58 is pivotally secured. The remote end of the cylinder 60 of each fluid motor 58 is pivotally secured between a pair of upstanding apertured mounting lugs 62 by means of a pivot pin 64, the mounting lugs 62 being supported from the upper wall 66 of the corresponding reinforcing member 30.

Each reinforcing member 30 includes an elongated guard plate 68 which is secured at its forward end to the corresponding outer wall 70 of the associated reinforcing member 30 and which includes a laterally offset rear end 72 which overlaps the forward end of the corresponding arm member 42.

The trailer 10 is provided with a pair of lugs 74 which project forwardly of the crossbeam 28 and rotatably journal the opposite ends of a pivot shaft 76. A V-shaped tongue assembly generally referred to by the reference numeral 80 is provided and is pivotally supported, at the free ends of its arms 82 and 84 from the end portions of the pivot shaft 76 which project through the mounting lugs or ears 74. The forward end portions of the arms 82 and 84 are interconnected by means of a transverse brace 86 and the brace 86 includes a pair of upstanding mounting lugs 88. The free end of the piston rod 90 of an extendable fluid motor generally referred to by the reference numeral 92 is pivotally secured to the upper end of an upstanding lever arm 94 secured to the center portion of the crossbeam 28. The remote end of the cylinder 96 of the fluid motor 92 is pivotally supported between the mounting lugs 88 by means of a pivot pin 98.

The forward end of the tongue 80 includes an apertured extension 100 which is adapted to be loosely pivotally supported from a towbar 102 carried by a towing vehicle generally referred to by the reference numeral 104. The fluid motors 58 and 92 are provided with suitable fluid supply lines 106, 108 and 110 and the fluid supply lines may be operatively connected to a suitable control valve assembly generally referred to by the reference numeral 112 supported from the towing vehicle 104 and communicated with a suitable source of fluid under pressure.

Figure 2:
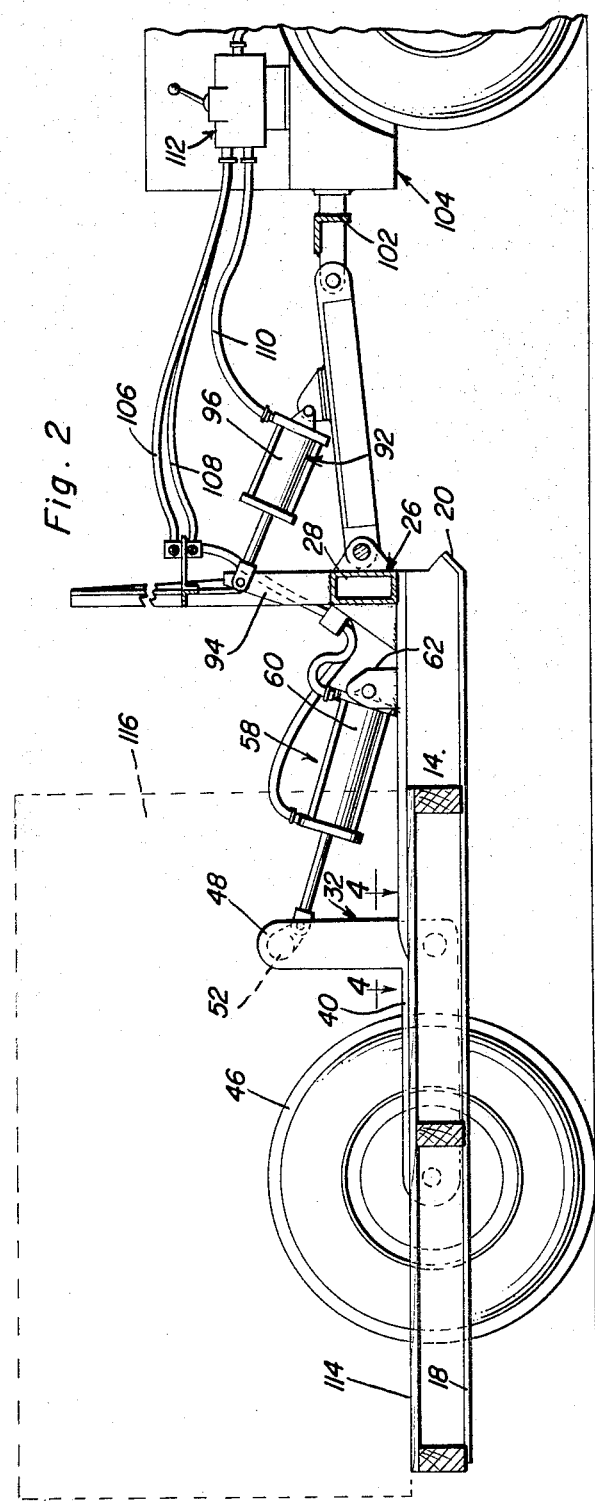
FIGURE 2 is a longitudinal vertical sectional view taken substantially upon the plane indicated by the section line 2—2 of FIGURE 1.
Figure 3:
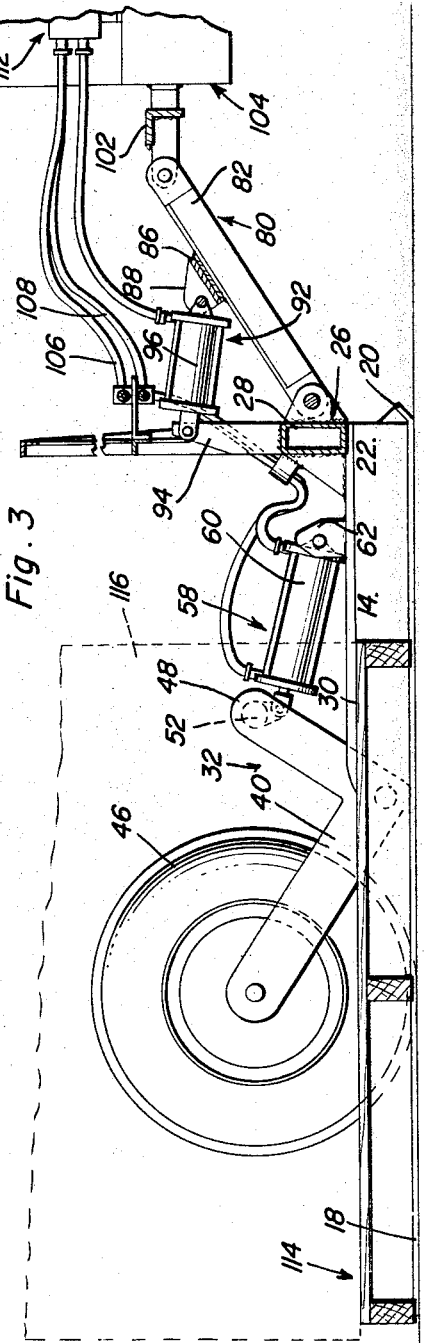
FIGURE 3 is a longitudinal vertical sectional view similar to that of FIGURE 2 but shown with the lift-type load bed of the trailer in the lowered position.

In operation, the main frame 12 of the trailer 10 is adapted to be lowered to the position illustrated in FIGURE 3 of the drawings by actuation of the fluid motors 58 and 92 whereupon a pallet 114 having a load 116 positioned thereon may be picked up by the frame 12 by backing the trailer 10 beneath the pallet 114. Another method of loading the main frame 12 with the pallet 114 would be to have the pallet 114 loaded while being disposed on an elongated support which could be straddled by the longitudinal members 14 and 16. In this manner, the trailer 10 may be backed beneath the pallet 114 and properly positioned relative thereto before the fluid motors 58 and 92 are actuated to return the frame 12 to its elevated traveling position illustrated in FIGURE 2 of the drawings. Then, the towing vehicle 104 may be utilized to tow the trailer 10 to a central unloading point at which the trailer 10 may again straddle an elongated support such as a conveyor or the like onto which the pallet 114 may be lowered by lowering the main frame 12.

From a comparison of FIGURES 2 and 3 of the drawings it may be seen that the fluid motors 58 and 92 are utilized in conjunction with each other to lower the main frame 12 of the trailer 10 in a manner such that it remains substantially horizontally disposed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A trailer with a lift-type load bed, comprising: (a) a pair of spaced apart, longitudinal main frame members, (b) transverse frame means interconnecting said main frame members at their forward ends leaving the area between said main frame members unobstructed rearwardly of said transverse means and having towing means attached thereto, (c) reinforcing members attached generally to the outside, forward portion of each of said main frame members, (d) a trailing arm means pivotally secured to the rear end of each of said reinforcing members, each of said trailing arm means having a generally rearwardly extending arm portion on which is rotatably supported a ground-engaging wheel, each of said trailing arm means also having a generally upwardly extending lever arm portion, and (e) extendible fluid motor means pivotally secured at one end thereof on each of said reinforcing members and the other end of said fluid motor means being pivotally attached to the outer end of said lever arm portion, whereby said load bed may be raised when said motor is extended and lowered when said motor is retracted.

2. The trailer structure according to claim 1 and in which said towing means comprises a towing tongue member rotatably attached to the forward side of said transverse frame means, said tongue means including a front extensible fluid motor pivotally supported at one end thereon, and the other end of said front extensible motor being pivotally secured to the outer end of upstanding arm means rigidly converted to said transverse frame means.

3. A trailer with a lift-type load bed, comprising: (a) a pair of spaced apart, longitudinal main frame members which are generally L-shaped in cross section so that the horizontal sections are inboard and the vertical sections are outboard, (b) transverse frame means interconnecting said main frame members at their forward ends leaving the area between said main frame members unobstructed rearwardly of said transverse means, (c) reinforcing members attached generally to the outside, forward portion of each of said main frame on said vertical sections, (d) a generally L-shaped trailing arm means pivotally secured to the rear end of each of said reinforcing members, each of said trailing arm means having a generally rearwardly extending arm portion on which is rotatably supported a ground-engaging wheel, each of said trailing arm means also having a generally upwardly extending lever arm portion, and (e) extensible fluid motor means pivotally at one end thereof on each of said reinforcing members and the other end of said fluid motor means being pivotally attached to the outer end of said lever arm portion, whereby said load bed may be raised when said motor is retracted.

4. The trailer structure according to claim 3 and in which said towing means comprises a towing tongue member rotatably attached to the forward side of said transverse frame means, said tongue means including a front extensible fluid motor pivotally supported at a one end thereon, and the other end of said front extensible motor being pivotally secured to the outer end of upstanding arm means rigidly converted to said transverse frame means.

References Cited by the Examiner

UNITED STATES PATENTS

| 2,780,475 | 2/1957 | Koerner | 280—43.23 |
| 2,788,908 | 4/1957 | Lynd | 280—43.23 |
| 2,830,519 | 4/1958 | Chandler et al. | 280—43.23 |
| 2,992,750 | 7/1961 | Brock | 214—506 |

BENJAMIN HERSH, *Primary Examiner.*

C. C. PARSONS, *Assistant Examiner.*